(12) United States Patent
Wu

(10) Patent No.: US 8,717,297 B2
(45) Date of Patent: May 6, 2014

(54) MOUSE WITH MULTI-CONFIGURABLE BUTTONS

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 260 days.

(21) Appl. No.: 13/416,935

(22) Filed: Mar. 9, 2012

(65) Prior Publication Data

US 2013/0082927 A1    Apr. 4, 2013

(30) Foreign Application Priority Data

Sep. 30, 2011   (TW) .............................. 100135622 A

(51) Int. Cl.
G06F 3/033          (2013.01)
(52) U.S. Cl.
USPC ......................................................... 345/163
(58) Field of Classification Search
CPC combination set(s) only.
See application file for complete search history.

(56) References Cited

U.S. PATENT DOCUMENTS 5,235,868 A  *  8/1993  Culver ..................... 74/471 XY

* cited by examiner

*Primary Examiner* — Van Chow
(74) *Attorney, Agent, or Firm* — Kirton McConkie; Evan R. Witt

(57) ABSTRACT

A mouse with multi-configurable buttons is provided. The mouse with multi-configurable buttons comprises a housing, a cylinder module and a signal processing device. The housing has an opening, and the cylinder module is received in the housing and partially exposed through the opening. The cylinder module at least comprises a first click portion and the second click portion, and the signal processing device at least comprises a first switch and a second switch. When the first click portion is exposed through the opening, the first click portion is used for activating the first switch. In contrast, when the second portion is exposed through the opening, the second click portion is used for activating the first and the second switch. Therefore, the mouse with multi-configurable buttons provides at least two configuration status via rotating the rotating cylinder to satisfy different user demands.

18 Claims, 16 Drawing Sheets

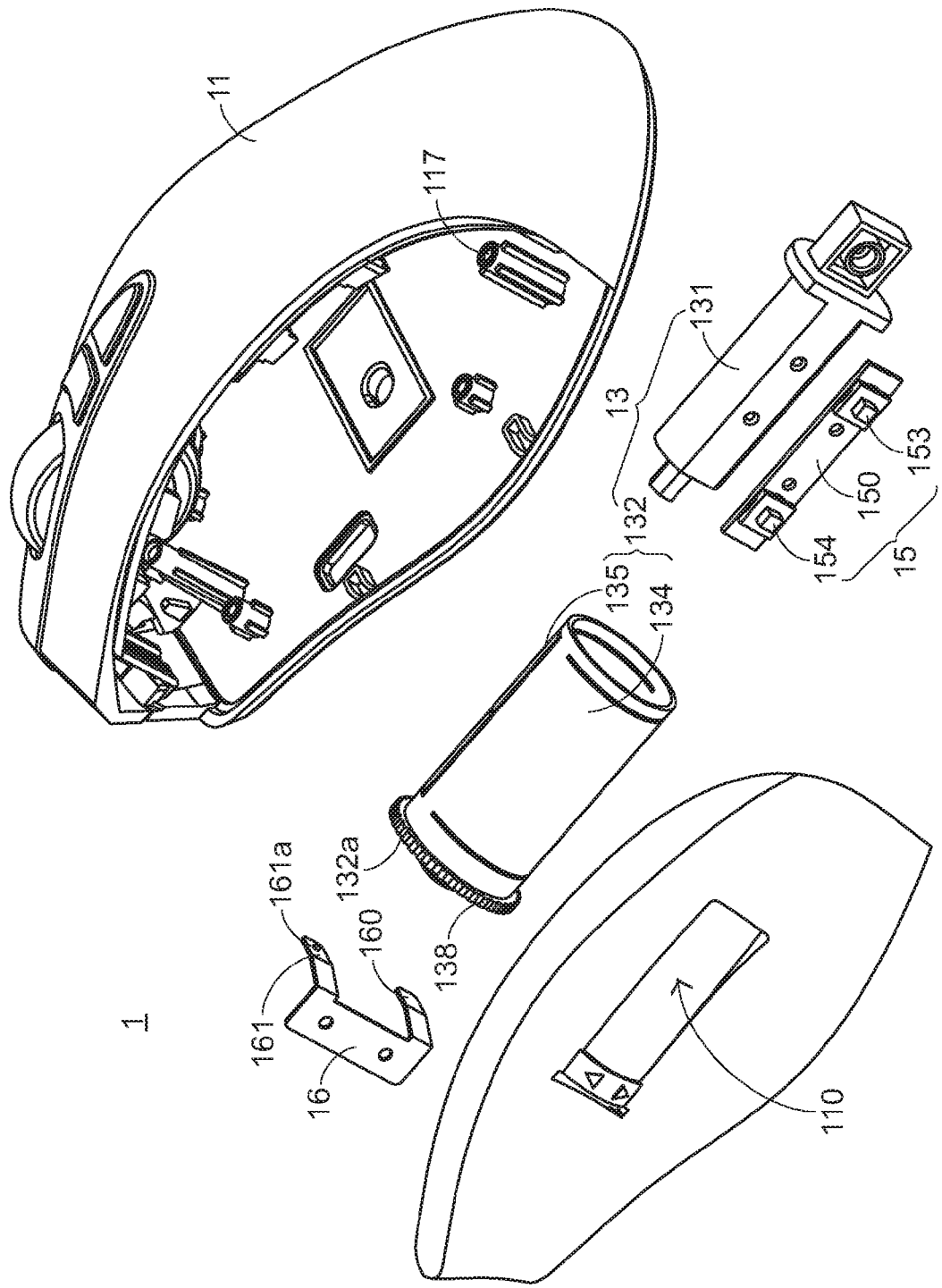

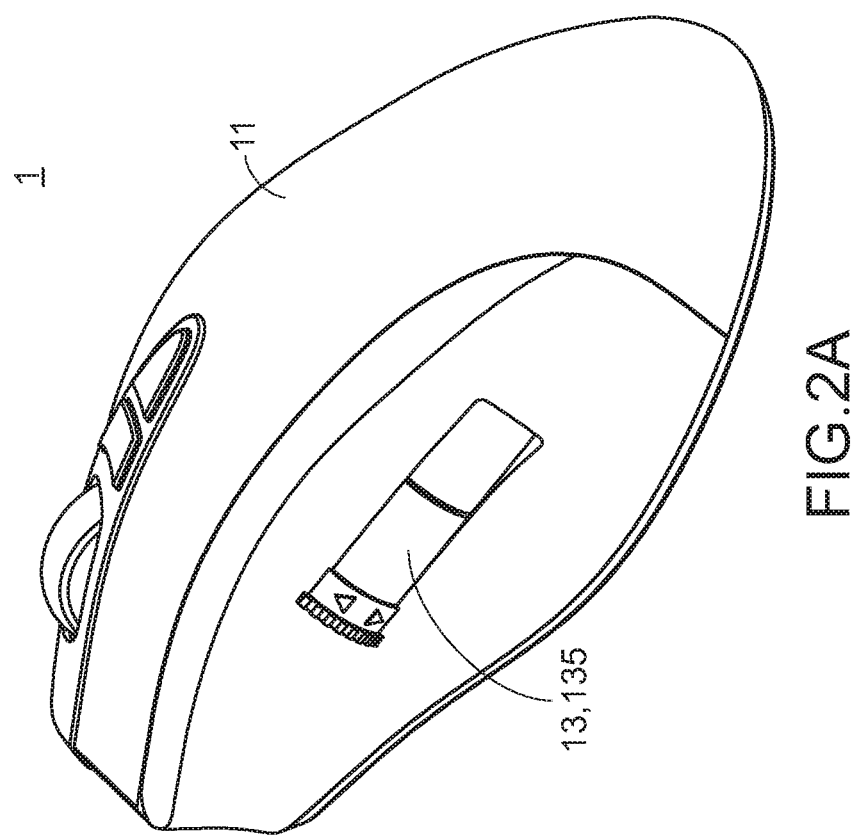

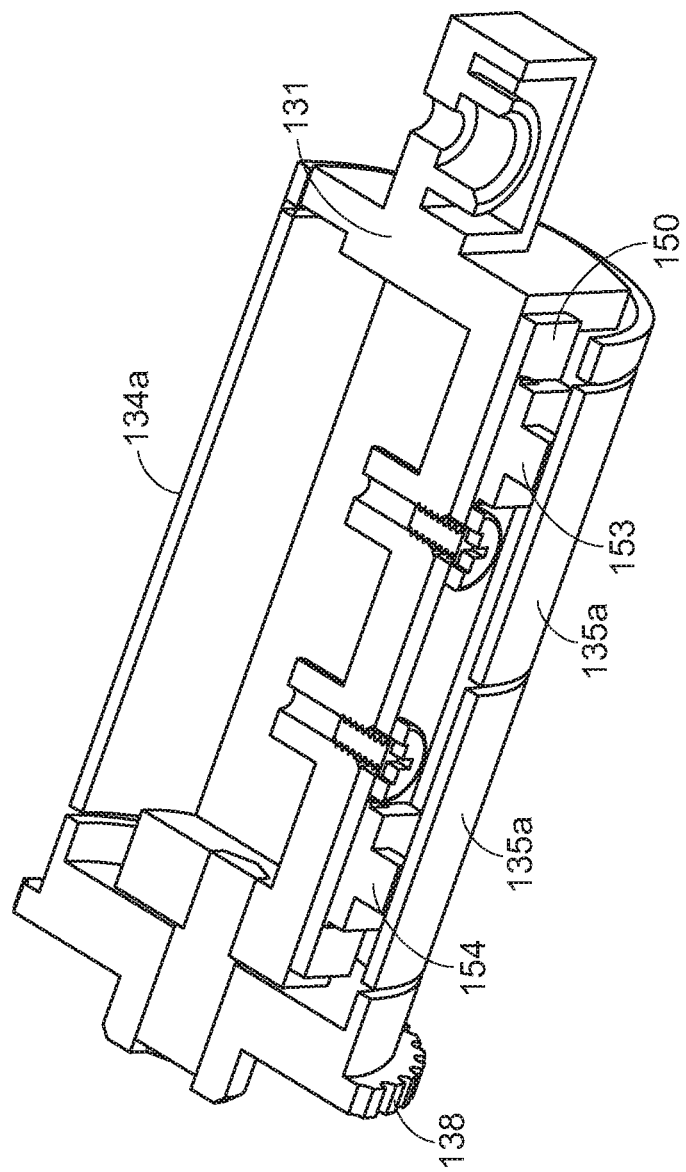

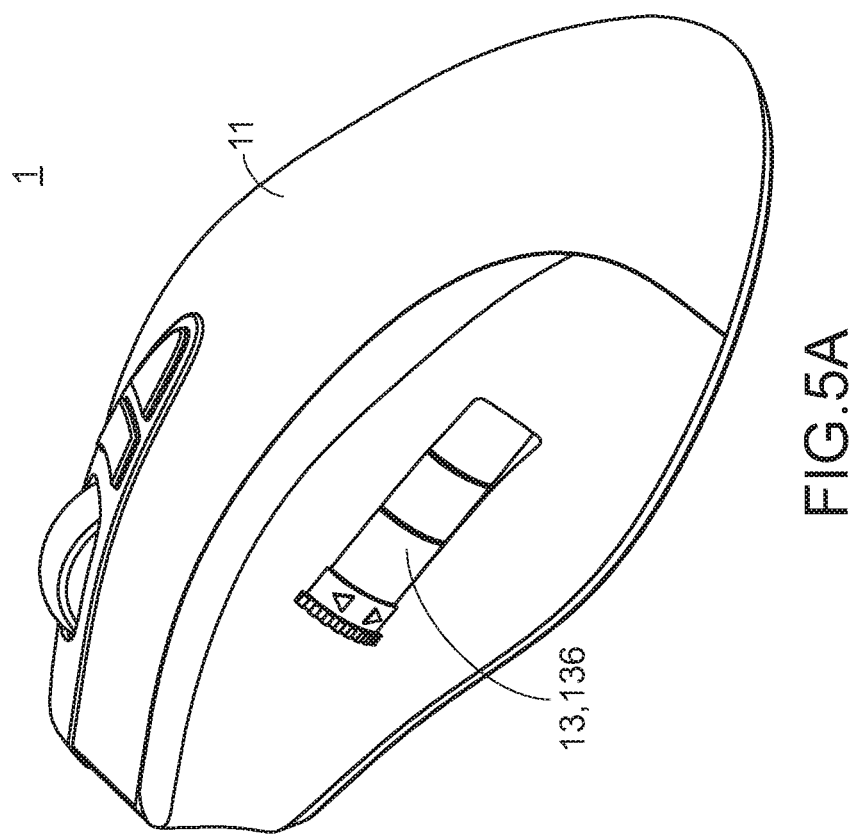

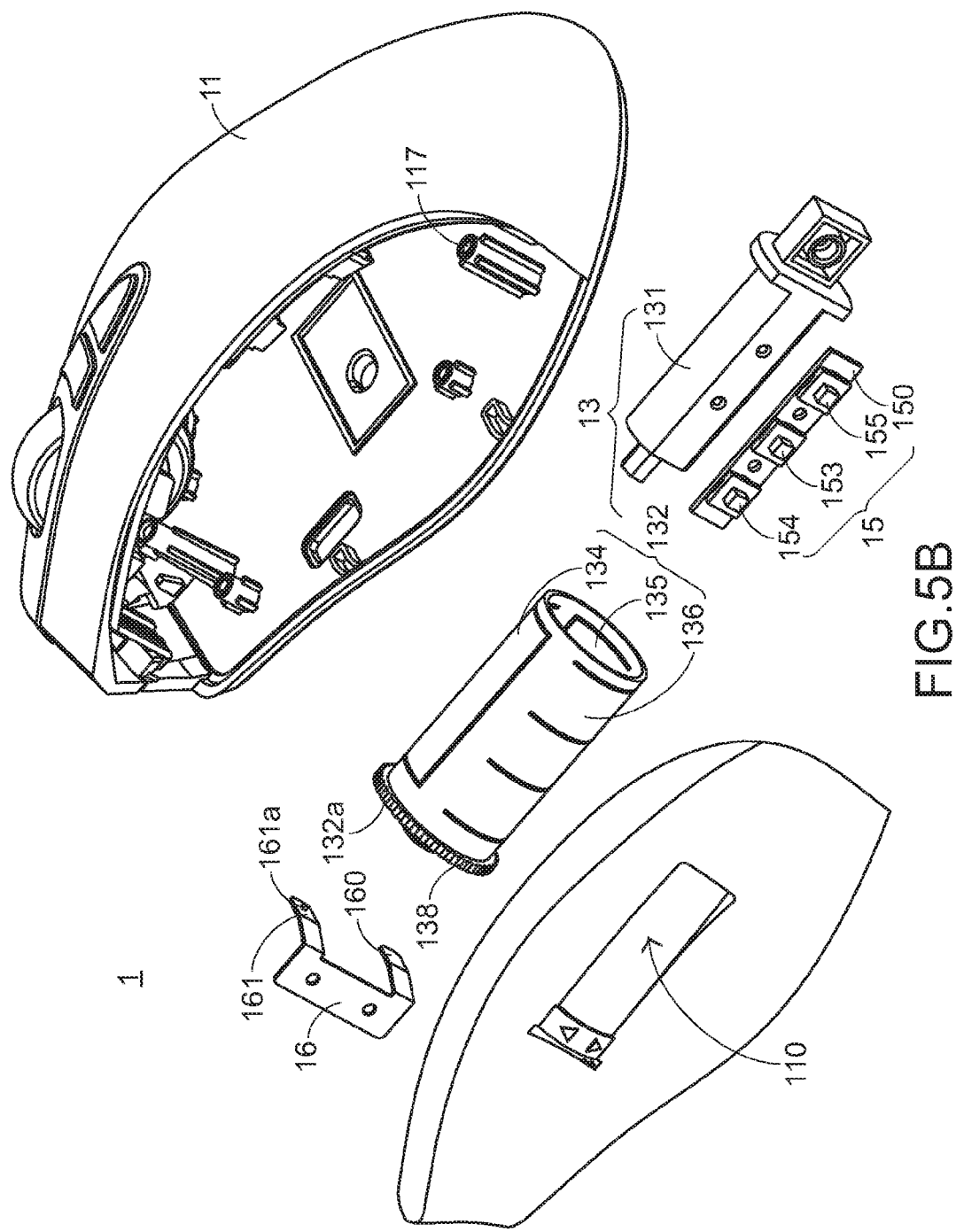

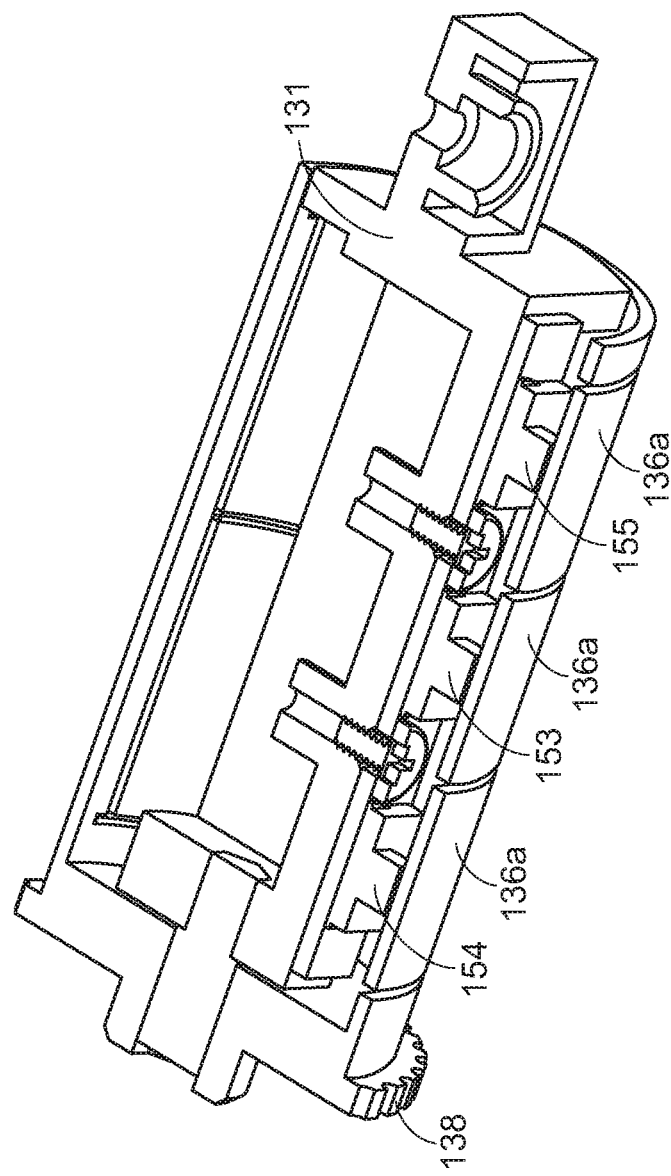

MOUSE WITH MULTI-CONFIGURABLE BUTTONS

FIELD OF THE INVENTION

The present invention generally relates to a mouse, and more particularly to a mouse with multi-configurable buttons capable of being switched according to an actual demand of a user.

BACKGROUND OF THE INVENTION

With the development of technology, the personal computer (PC) has become an important tool for most of people to use in work, learning and entertainment. In addition, the mouse is one of the most popular input devices for the computer presently, which is capable of inputting various commands to the PC by controlling the cursor on the screen to move accompanying with pressing the buttons to activate the switches. With the time for people operating the PC increasing, users attach great importance to the mouse in various requirements. In contrast with the original mouse equipped with a left button and a right button only, the present mouse is further equipped with a roller and the buttons have various functions. However, it is still doubted whether the buttons with various function are capable of completely achieving all of a user's requirements during processing various software.

A required number of the buttons to a user may be varied with the software being operated when the user is operating a computer. For example, a significant amount of the shortcut buttons are required for rapidly inputting commands when a user plays a computer game. In this case, the user may need a lot of function buttons. Therefore, many mouse manufacturers compete to launch various mice accompanied with a plurality of function buttons. However, the accompanying problem is that once the user switches to operate other software unnecessary to use all of the function buttons, some of the function buttons become redundant and useless. Further, since the volume of the mouse develops towards thinner and smaller, the plurality of buttons disposed on the mouse becomes more crowded. Therefore, the user is likely to inadvertently press an adjacent button when trying to press a desired button during operating the mouse, and thus an error command is inputted. In a word, the mouse originally expected to improve operational efficiency of the user becomes a bother on the contrary. As a result, a number of the buttons of the conventional mouse as illustrated above is certainly unable to be varied or adjusted by a user according to a real operating condition.

In view of those above mentioned disadvantages, it is desired to provide a mouse with multi-configurable buttons capable of being switched according to an actual demand of a user.

SUMMARY OF THE INVENTION

The present invention is directed to providing a mouse with multi-configurable buttons, and thus a user is capable of easily switching a number of the buttons of the mouse in use for different operating conditions.

The present invention is also directed to providing a mouse with multi-configurable buttons comprising a housing, a cylinder module and a signal processing device. The housing has an opening. The cylinder module is received in the housing and partially exposed through the opening, wherein the cylinder module comprises a supporting shaft and a rotating cylinder. The supporting shaft is fixed within the housing, and the rotating cylinder is fitting onto the supporting shaft and rotating with respect to the supporting shaft. A cylindrical surface of the rotating cylinder is exposed through the opening, and the cylindrical surface at least comprises a first click portion and the second click portion arranged along a rotating direction of the rotating cylinder in sequence. The signal processing device is disposed between the supporting shaft and the rotating cylinder, wherein the signal processing device at least comprises a first switch and a second switch. When the first click portion is exposed through the opening, the first click portion is used for activating the first switch. In contrast, when the second portion is exposed through the opening, the second click portion is used for activating the first switch and the second switch.

In a preferred embodiment, wherein a first button is formed on the first click portion and having a dent. When the first button is pressed, the first button activates the first switch, while the second switch inserts into the dent and thus is not activated.

In a preferred embodiment, wherein two second buttons are formed on the second click portion along a direction parallel to the supporting shaft and used for respectively activating the first switch and the second switch.

In a preferred embodiment, wherein the housing comprises a positioning structure, and the positioning structure is fixed to an end of the supporting shaft.

In a preferred embodiment, the mouse further comprises a fastening elastic strip, wherein the fastening elastic strip has an inner end and an outer end, the inner end is fixed to the housing, and the outer end has a protruding portion.

In a preferred embodiment, wherein the rotating cylinder has an outer bottom surface parallel to a radial direction of the rotating cylinder, and the outer bottom surface has a first denting portion and a second denting portion. When the protruding portion is engaged with the first denting portion, the first click portion is exposed through the opening. In contrast, when the protruding portion is engaged with the second denting portion, the second click portion is exposed through the opening.

In a preferred embodiment, wherein the rotating cylinder further comprises a gear structure, and the gear structure surrounds the cylindrical surface of the rotating cylinder.

In a preferred embodiment, wherein the signal processing device further comprises a circuit board used for disposing the first switch and the second switch.

In a preferred embodiment, wherein the cylindrical surface further comprises a third click portion along the rotating direction.

In a preferred embodiment, wherein the signal processing device further comprises a third switch.

In a preferred embodiment, wherein a first button is formed on the first click portion and having a first dent and a second dent. When the first button is pressed, the first button activates the first switch, while the second switch and the third switch insert into the first dent and the second dent respectively and thus are not activated.

In a preferred embodiment, wherein two second buttons are formed on the second click portion along a direction parallel to the supporting shaft, and a third dent is formed on where the two second buttons are adjacent to each other. The two buttons are used for being pressed and thus respectively activate the second switch and the third switch. When any one of the second buttons is pressed, the first switch inserts into the third dent and thus is not activated.

In a preferred embodiment, wherein three third buttons are formed on the third click portion along the direction parallel to the supporting shaft and used for respectively activating the first switch, the second switch and the third switch.

In a preferred embodiment, wherein the housing comprises a positioning structure, and the positioning structure is fixed to the supporting shaft.

In a preferred embodiment, the mouse further comprises a fastening elastic strip, wherein the fastening elastic strip has an inner end and an outer end, the inner end is fixed to the housing, and the outer end has a protruding portion.

In a preferred embodiment, wherein the rotating cylinder has an outer bottom surface parallel to a radial direction of the rotating cylinder, and the outer bottom surface has a first denting portion, a second denting portion and a third denting portion. When the protruding portion is engaged with the first denting portion, the first click portion is exposed through the opening. When the protruding portion is engaged with the second denting portion, the second click portion is exposed through the opening. In contrast, when the protruding portion is engaged with the third denting portion, the third click portion is exposed through the opening.

In a preferred embodiment, wherein the rotating cylinder further comprises a gear structure, and the gear structure surrounds the cylindrical surface of the rotating cylinder.

In a preferred embodiment, wherein the signal processing device further comprises a circuit board used for disposing the first switch, the second switch and the third switch.

BRIEF DESCRIPTION OF THE DRAWINGS

FIG. 1B illustrates an explosion view of the mouse with multi-configurable buttons according to the first embodiment of the present invention, wherein the first click portion is exposed.

FIG. 2A illustrates a perspective view of the mouse with multi-configurable buttons according to the first embodiment of the present invention, wherein a second click portion is exposed.

FIG. 2C illustrates a cross-sectional view of the mouse with multi-configurable buttons according to the first embodiment of the present invention, wherein the second click portion is exposed.

FIG. 5A illustrates a perspective view of the mouse with multi-configurable buttons according to the second embodiment of the present invention, wherein a third click portion is exposed.

FIG. 5B illustrates an explosion view of the mouse with multi-configurable buttons according to the second embodiment of the present invention, wherein the third click portion is exposed.

FIG. 5C illustrates a cross-sectional view of the mouse with multi-configurable buttons according to the second embodiment of the present invention, wherein the third click portion is exposed.

DETAILED DESCRIPTION OF THE PREFERRED EMBODIMENT

The present invention provides a kind of mouse with multi-configurable buttons. A plurality of embodiments for clearly describing the details of the present invention are illustrated hereinafter, and the descriptions of those embodiments are merely directed to explaining the present invention, wherein the numbers of the multi-configurable buttons on the mouse are respectively illustrated as two and three in detail. However, the following embodiments are provided for merely describing but not for limiting the real scope of the present invention.

Figure 1A:
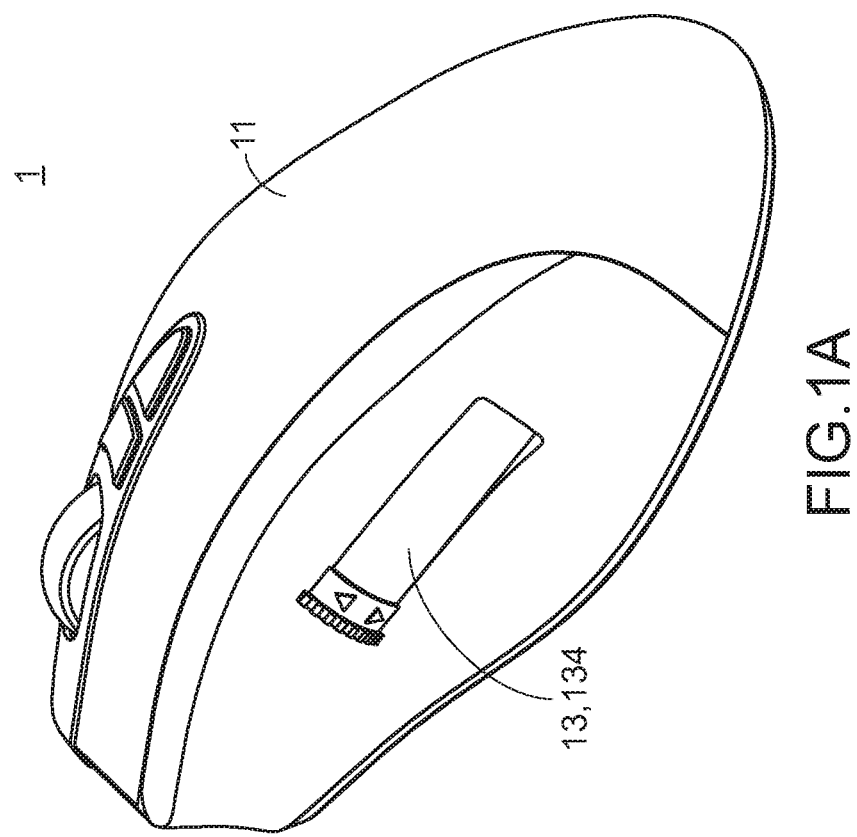
FIG. 1A illustrates a perspective view of a mouse with multi-configurable buttons according to a first embodiment of the present invention, wherein a first click portion is exposed.

First, FIG. 1A to FIG. 2C illustrate a mouse with multi-configurable buttons 1 according to a first embodiment of the present invention. In the present embodiment, the mouse with multi-configurable buttons 1 including two sets of multi-configurable buttons includes a housing 11, a cylinder module 13 and a signal processing device 15. Referring to FIG. 1A first, the housing 11 has an opening 110, the cylinder module 13 is received in the housing 11, and the cylinder module 13 is partially exposed through the opening 110. As a result, a user is capable of putting one of his (or her) fingers to the opening 110 of the housing 11, so as to slide the cylinder module 13. And then referring to FIG. 1B, herein, the cylinder 13 includes a supporting shaft 131 and a rotating cylinder 132, wherein the supporting shaft 131 is fixed within the housing 11, and the rotating cylinder 132 is fitting onto the supporting shaft 131. Therefore, the rotating cylinder 132 is capable of being slid by the user and thus capable of rotating with respect to the supporting shaft 131. In addition, the rotating cylinder 132 has a cylindrical surface, and the cylindrical surface includes a first click portion 134 and a second click portion 135 arranged along a rotating direction of the rotating cylinder 132 in sequence. In the present embodiment, a selected one of the first click portion 134 and the second click portion 135 can be exposed through the opening 110 by rotating the cylinder 13 according to a use requirement of the user and thus capable of being pressed by the user. Furthermore, the signal processing device 15 is disposed between the supporting shaft 131 and the rotating cylinder 132. Moreover, the signal processing device 15 includes a first switch 153 and a second switch 154, wherein the first switch 153 and the second switch 154 are preferred to be arranged in sequence along a direction parallel to the supporting shaft 131, and the first switch 153 and the second switch 154 are disposed facing towards the opening 110 of the housing 11. Hence, when the first click portion 134 is exposed through the opening 110, the first click portion 134 is just adjacent to the signal processing device 15, and then the user may activate the first switch 153 by pressing the first click portion 134 in the present instance. In contrast, when the second portion 135 is exposed through the opening 110, the second click portion 135 is just adjacent to the signal processing device 15, and then the user may activate the first switch 153 and the second switch 154 by pressing the second click portion 135 in the present instance.

Figure 1C:
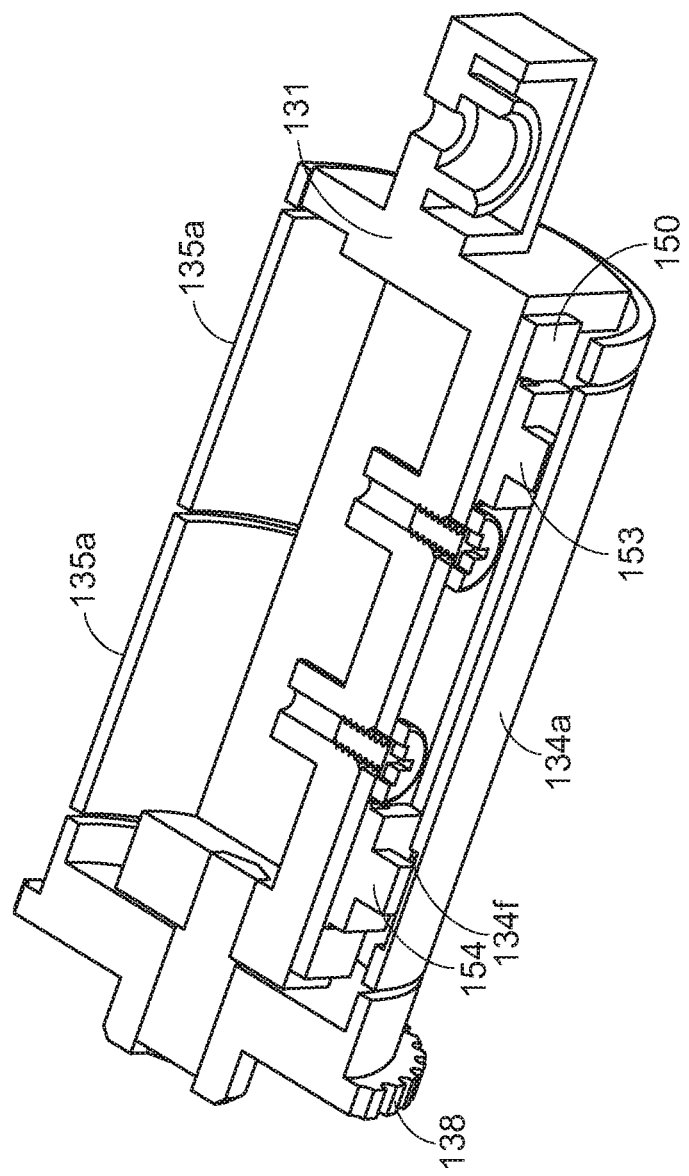
FIG. 1C illustrates a cross-sectional view of the mouse with multi-configurable buttons according to the first embodiment of the present invention, wherein the first click portion is exposed.

Referring to FIG. 1A, FIG. 1B and FIG. 1C again, which illustrate a perspective view, an explosion view and a cross-sectional view of the mouse with multi-configurable buttons 1 according to the present embodiment respectively, wherein the first click portion 134 is exposed through the opening 110. As illustrated in FIG. 1C, there is a first button 134a formed on the first click portion 134, and the first button 134a has a dent 134f, and thus when the first button 134a is pressed by the user, the first button 134a moves towards and thus close to the first switch 153 and the second switch 154. Thus, the first switch 153 is capable of being contacted and thus further activated by the first button 134a. In the present instance, the second switch 154 is not activated due to a depth and a width of the dent 134f is enough to contain the second switch 154. The above mentioned descriptions illustrate an operating configuration in the first embodiment, wherein the first button 134a is exposed through the opening 110. In another word, the mouse with multi-configurable buttons 1 is switched to a configuration with a single button for operation.

Figure 2B:
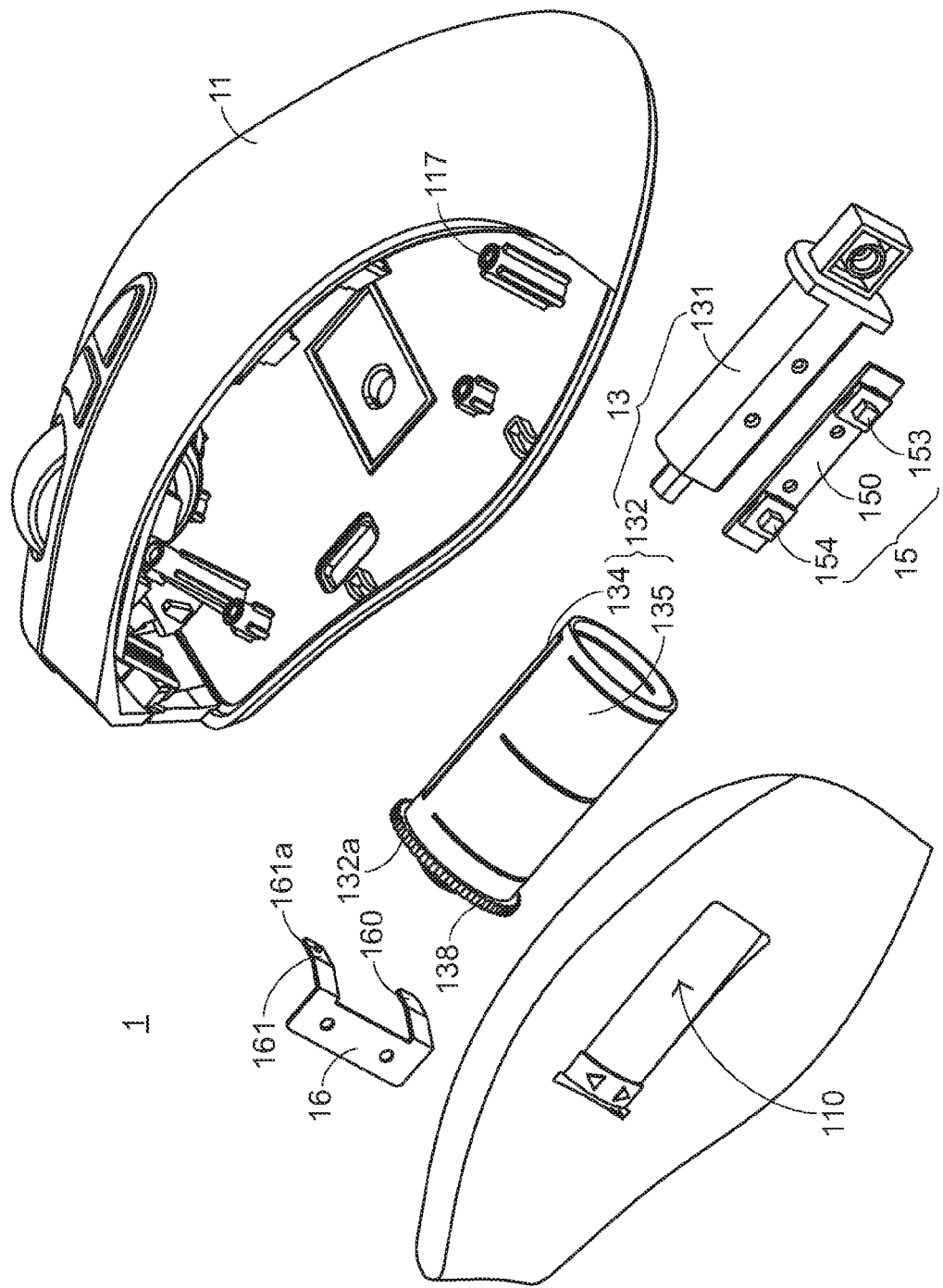
FIG. 2B illustrates an explosion view of the mouse with multi-configurable buttons according to the first embodiment of the present invention, wherein the second click portion is exposed.

Moreover, referring to FIG. 2A, FIG. 2B and FIG. 2C, which illustrate a perspective view, an explosion view and a cross-sectional view of the mouse with multi-configurable buttons 1 according to the present embodiment respectively, wherein the second click portion 135 is exposed through the opening 110. There are two second buttons 135a formed on the second click portion 135 along a direction parallel to the supporting shaft 131, and the two second buttons 135a are arranged corresponding to the first switch 153 and the second switch 154 when the second click portion 135 is exposed through the opening 110. Hence, when the two second buttons 135a are respectively pressed by the user, the two second buttons 135a move towards and thus close to the first switch 153 and the second switch 154 respectively. Thus, the first switch 153 and the second switch 154 are capable of being contacted and thus further activated by the two second buttons 135a respectively. The above mentioned descriptions illustrate an operating configuration in the first embodiment, wherein the two second buttons 135a are exposed through the opening 110. In another word, the mouse with multi-configurable buttons 1 is switched to a configuration with two buttons for operation. It should be noted that the arranged direction of the buttons and the switches is illustrated for a preferred embodiment only and thus should not be read as a limitation. As a result, after determining to use the single button or the two buttons according to different operating requirements, the user is capable of sliding the rotating cylinder 132 through the opening 110 of the housing 11 by his (or her) finger, so as to expose the first click portion 134 or the second click portion 135 through the opening 110 for a single button operating usage or a two buttons operating usage.

Figure 6A:
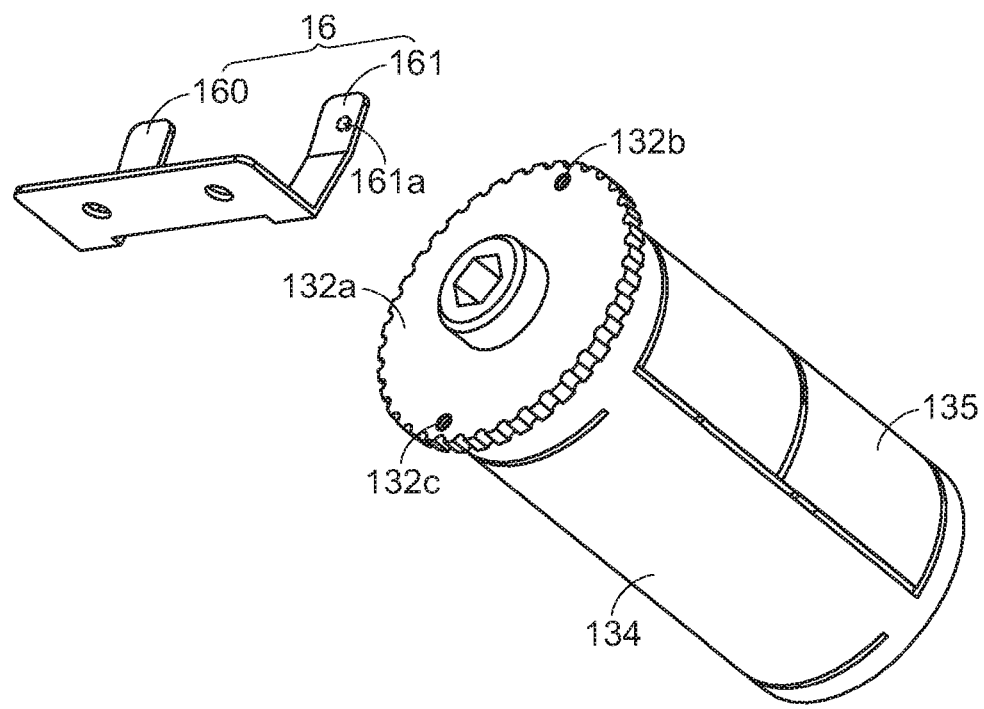
FIG. 6A illustrates a perspective view of a rotating cylinder of the mouse with multi-configurable buttons according to the first embodiment of the present invention.

Referring to FIG. 1B and FIG. 2B, which illustrate the explosion views respectively about the first click portion 134 and the second click portion 135 being exposed through the opening 110 according to the first embodiment. Herein, the housing 11 includes a positioning structure 117, and the housing 11 is fixed to an end of the supporting shaft 131 with the positioning structure 117, so as to hold the positioning structure 117 within the housing 11. In addition, the mouse with multi-configurable buttons 1 further includes a fastening elastic strip 16, wherein the fastening elastic strip 16 has an inner end 160 and an outer end 161. The fastening elastic strip 16 is fixed to the housing 11 with the inner end 160, the outer end 161 of the fastening elastic strip 16 extends towards the rotating cylinder 132, and the outer end 161 has a protruding portion 161a. Furthermore, the rotating cylinder 132 has an outer bottom surface 132a parallel to a radial direction of the rotating cylinder 132, the outer bottom surface 132a has a first denting portion 132b and a second denting portion 132c (as shown in FIG. 6A), and the first denting portion 132b and the second denting portion 132c are capable of containing the protruding portion 161a. Therefore, when the protruding portion 161a of the outer end 161 of the fastening elastic strip 16 is engaged with the first denting portion 132b, the first click portion 134 is exposed through the opening 110, so as to provide the position limitation for the single button operating usage switched by the user. In contrast, when the protruding portion 161a of the outer end 161 of the fastening elastic strip 16 is engaged with the second denting portion 132c, the second click portion 135 is exposed through the opening 110, so as to provide the position limitation of the two buttons operating usage switched by the user. According to the foregoing configurations of the protruding portion 161a relative to the first denting portion 132b and the second denting portion 132c accompanied with the fastening elastic strip 16 capable of sustaining elastic deformation partially, the user is capable of easily executing the position limitation of the rotating cylinder 132 by rotating the rotating cylinder 132.

Moreover, in order to let the user conveniently execute the position limitation by sliding the rotating cylinder 132, the rotating cylinder 132 further includes a gear structure 138, and the gear structure 138 surrounds the cylindrical surface of the rotating cylinder 132, so as to enhance a hand feeling when the user sliding the rotating cylinder 132. In addition, in a preferred implementation method, the signal processing device 15 further includes a circuit board 150 for disposing the first switch 153 and the second switch 154. However, the above mentioned description is illustrated for an embodiment only and thus should not be read as a limitation, and all of the equivalent variations thereof are claimed in the claims.

Further, referring to FIG. 3A to FIG. 5C hereinafter, which illustrate the mouse with multi-configurable buttons 1 according to a second embodiment of the present invention. In the present embodiment, the mouse with multi-configurable buttons 1 includes three adjustable button sets. Most of the structures in the present embodiment are similar to those of the first embodiment and includes a housing 11, a cylinder module 13 and a single processing device 15 as well, wherein all of the structures similar to those of the first embodiment, such as the cylinder module 13 is received in the housing 11, the housing 11 has an opening 110, and the cylinder module 13 is partially exposed through the opening 110, are omitted herein. However, what of the present embodiment different than the first embodiment is that the cylindrical surface of the rotating cylinder 132 of the mouse with multi-configurable buttons 1 includes a first click portion 134, a second lick portion 135 and a third click portion 136 in sequence along a rotating direction of the rotating cylinder 132. In the present embodiment, the user is capable of selecting to expose one of the first click portion 134, the second click portion 135 and the third click portion 136 according to the operating requirements. Moreover, the signal processing device 15 disposed between the supporting shaft 131 and the rotating cylinder 132 includes a first switch 153, a second switch 154 and a third switch 155. Herein, the first switch 153, the second switch 154 and the third switch 155 are preferred to be arranged in sequence along a direction parallel to the supporting shaft 131, and the first switch 153, the second switch 154 and the third switch 155 are disposed facing towards the opening 110 of the housing 11. Hence, when the first click portion 134 is exposed through the opening 110, the first click portion 134 is just adjacent to the signal processing device 15, and then the user may activate the first switch 153 by pressing the first click portion 134. In contrast, when the second portion 135 is exposed through the opening 110, the second click portion 135 is just adjacent to the signal processing device 15, and then the user may activate the first switch 153 and the second switch 154 by pressing the second click portion 135. Furthermore, when the third portion 136 is exposed through the opening 110, the third click portion 136 is just adjacent to the signal processing device 15, and then the user may activate the first switch 153, the second switch 154 and the third switch 155 by pressing the third click portion 136.

Figure 3A:
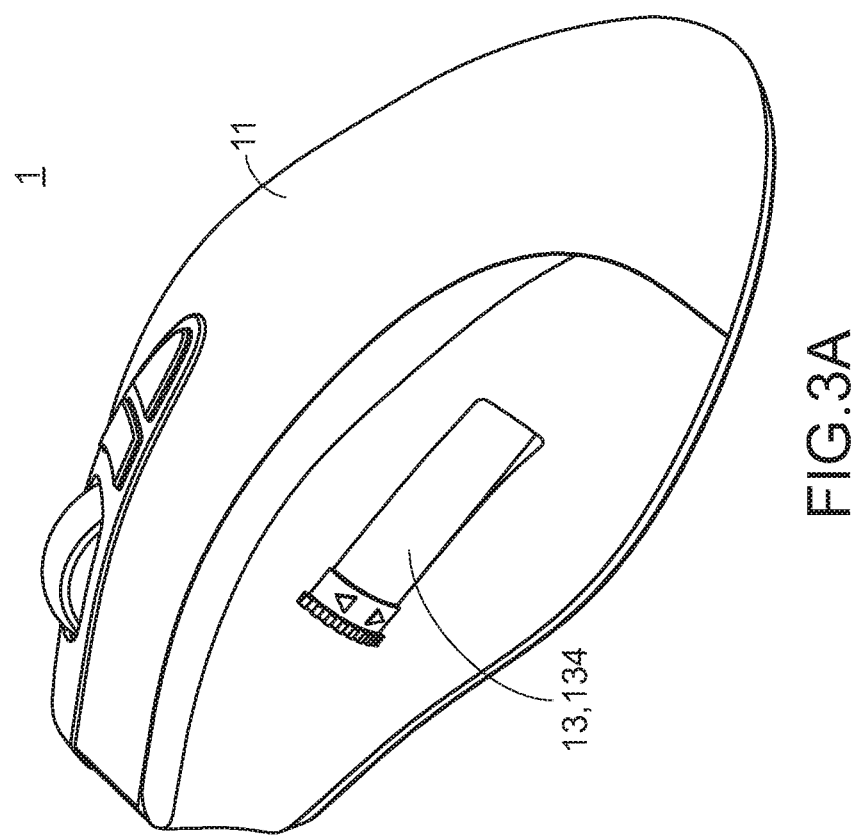
FIG. 3A illustrates a perspective view of a mouse with multi-configurable buttons according to a second embodiment of the present invention, wherein a first click portion is exposed.
Figure 3B:
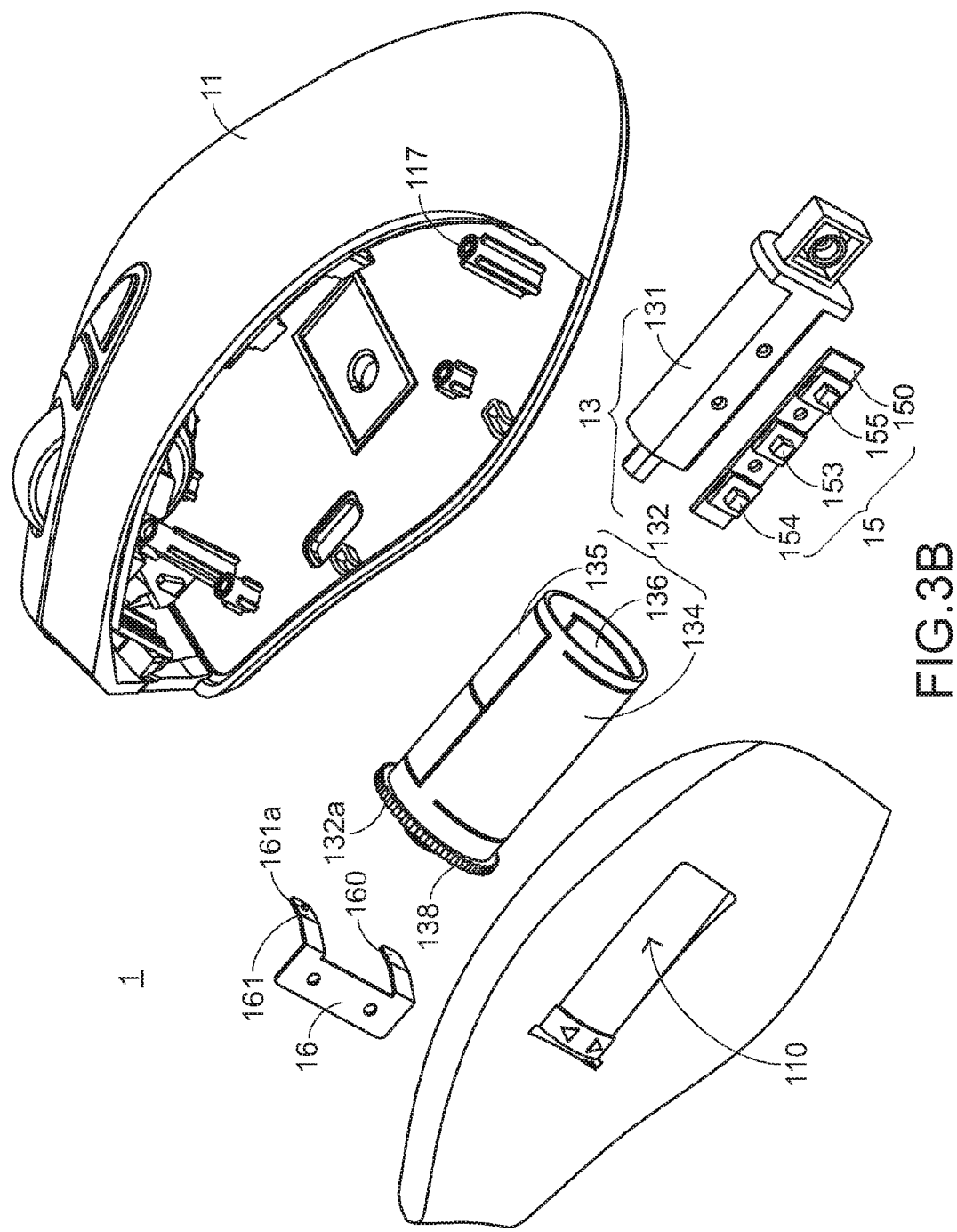
FIG. 3B illustrates an explosion view of the mouse with multi-configurable buttons according to the second embodiment of the present invention, wherein the first click portion is exposed.
Figure 3C:
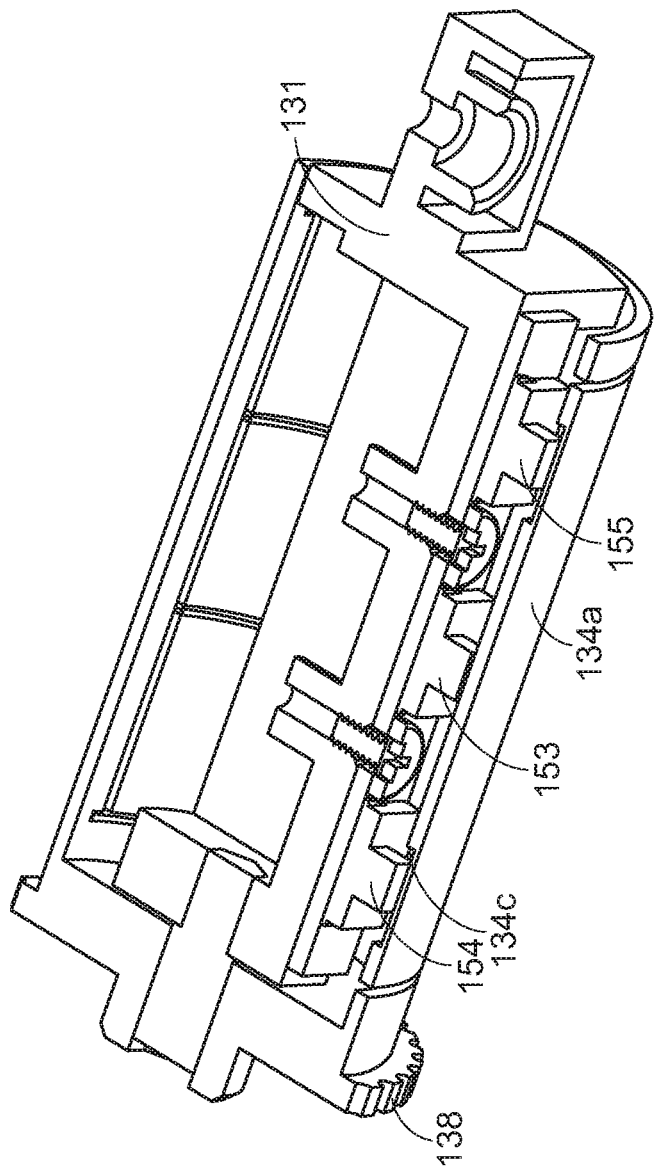
FIG. 3C illustrates a cross-sectional view of the mouse with multi-configurable buttons according to the second embodiment of the present invention, wherein the first click portion is exposed.

Referring to FIG. 3A, FIG. 3B and FIG. 3C, which illustrate a perspective view, an explosion view and a cross-sectional view of the mouse with multi-configurable buttons 1 according to the present embodiment respectively, wherein the first click portion 134 is exposed through the opening 110. Herein, there is a first button 134a formed on the first click portion 134, and the first button 134a has a first dent 134c and a second dent 134d, and thus when the first button 134a is pressed by the user, the first button 134a moves towards and thus close to the first switch 153, the second switch 154 and the third switch 155. Thus, the first switch 153 is capable of being contacted and thus further activated by the first button 134a. In contrary, the second switch 154 and the third switch 155 insert into the first dent 134c and the second dent 134d respectively, and thus the second switch 154 and the third switch 155 are not activated due to the depths and the widths of the first dent 134c and the second dent 134d are enough to contain the second switch 154 and the third switch 155. The above mentioned descriptions illustrate an operating configuration in the second embodiment, wherein the first button 134a is exposed through the opening 110. In a word, the mouse with multi-configurable buttons 1 is switched to a configuration with a single button for operation. It should be noted that the arranged direction of the buttons and the switches is illustrated for a preferred embodiment only and capable of being easily varied or modified according to an actual requirement of the skilled in the art. In a word, the arranged direction of the buttons and the switches illustrated herein should not be read as a limitation.

Figure 4A:
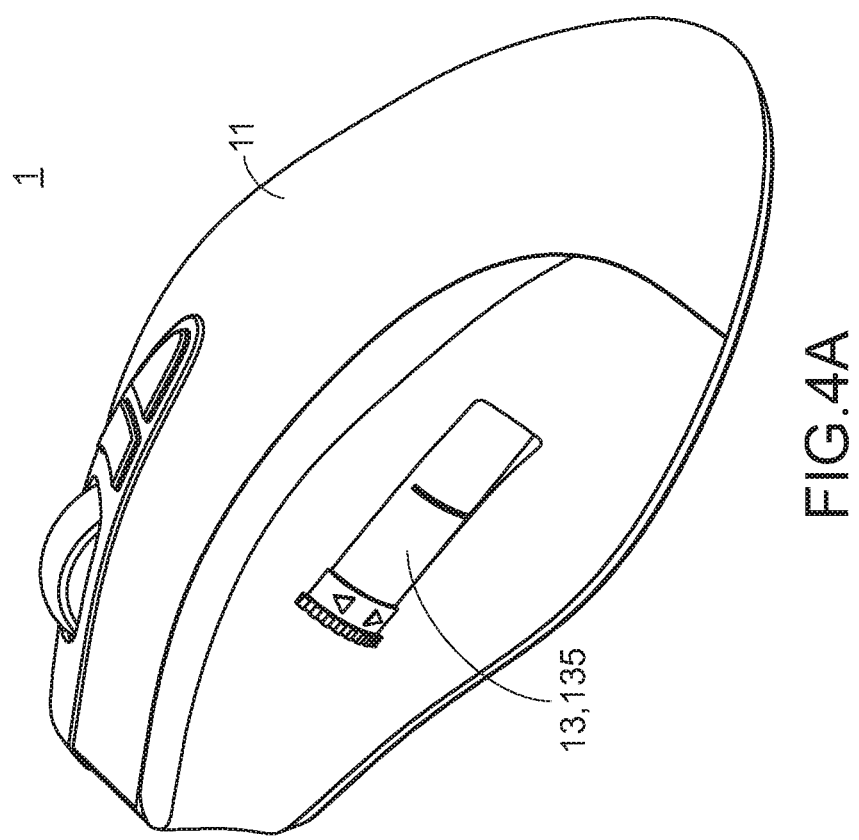
FIG. 4A illustrates a perspective view of the mouse with multi-configurable buttons according to the second embodiment of the present invention, wherein a second click portion is exposed.
Figure 4B:
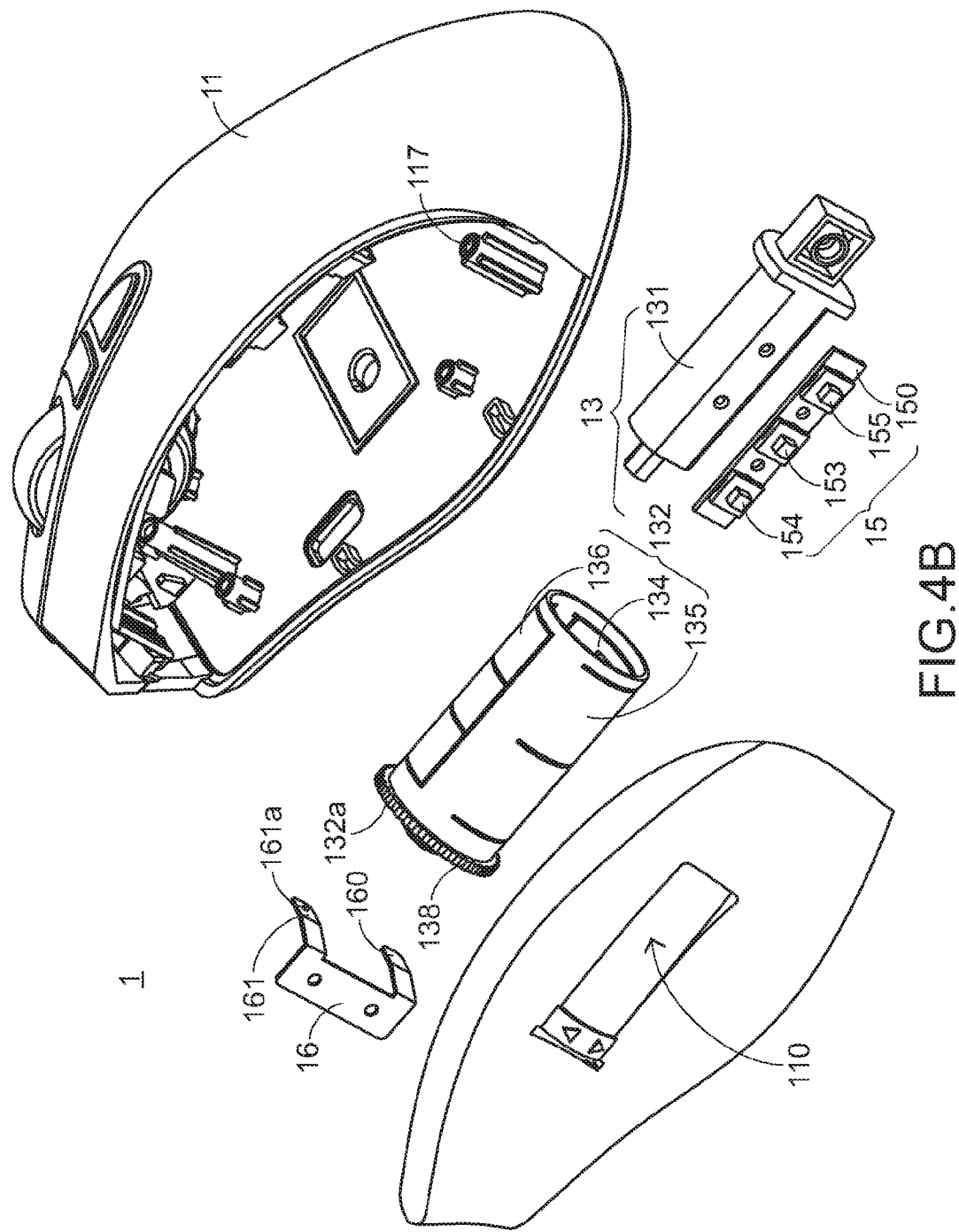
FIG. 4B illustrates an explosion view of the mouse with multi-configurable buttons according to the second embodiment of the present invention, wherein the second click portion is exposed.
Figure 4C:
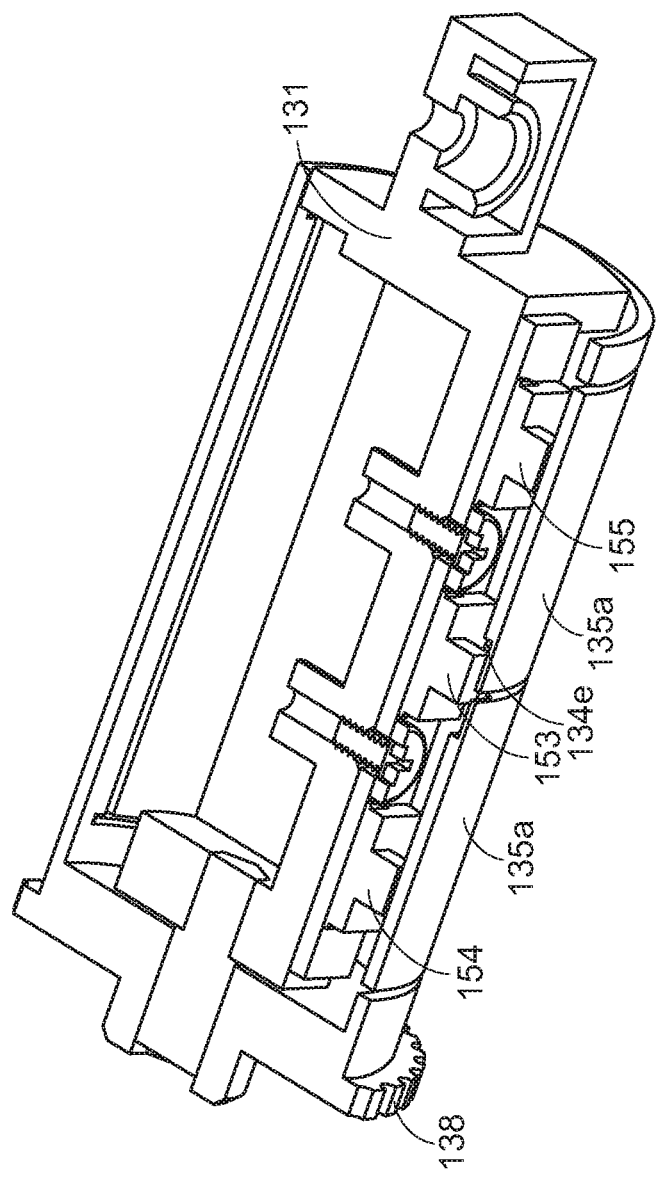
FIG. 4C illustrates a cross-sectional view of the mouse with multi-configurable buttons according to the second embodiment of the present invention, wherein the second click portion is exposed.

Besides, referring to FIG. 4A, FIG. 4B and FIG. 4C, which illustrate a perspective view, an explosion view and a cross-sectional view of the mouse with multi-configurable buttons 1 according to the present embodiment respectively, wherein the second click portion 135 is exposed through the opening 110. There are two second buttons 135a formed on the second click portion 135 along the direction parallel to the supporting shaft 131, and the two second buttons 135a are arranged corresponding to the second switch 154 and the third switch 155 when the second click portion 135 is exposed through the opening 110. In addition, a third dent 134e is formed on where the two second buttons 135a are adjacent to each other. Thus, when the two second buttons 135a are respectively pressed by the user, the two second buttons 135a move towards and thus close to the second switch 154 and the third switch 155 respectively. Therefore, the second switch 154 and the third switch 155 are capable of being contacted and thus further activated by the two second buttons 135a respectively. Also, when any one of the two second buttons 135a is pressed, the first switch 153 inserts into the third dent 134e and thus is not activated. The above mentioned descriptions illustrate an operating configuration in the second embodiment, wherein the two second buttons 135a are exposed through the opening 110. In another word, the mouse with multi-configurable buttons 1 is switched to a configuration with two buttons for operation.

Referring to FIG. 5A, FIG. 5B and FIG. 5C next, which illustrate a perspective view, an explosion view and a cross-sectional view of the mouse with multi-configurable buttons 1 according to the present embodiment respectively, wherein the third click portion 136 is exposed through the opening 110. There are three third buttons 136a formed on the third click portion 136 along the direction parallel to the supporting shaft 131, and the three third buttons 136a are respectively arranged corresponding to the first switch 153, the second switch 154 and the third switch 155. Therefore, when the three third buttons 136a are respectively pressed by the user, the three third buttons 136a move towards and thus close to the first switch 153, the second switch 154 and the third switch 155 respectively. Accordingly, the first switch 153, the second switch 154 and the third switch 155 are capable of being contacted and thus further activated by the three third buttons 136a respectively. The above mentioned descriptions illustrate an operating configuration in the second embodiment, wherein the three third buttons 136a are exposed through the opening 110. In another word, the mouse with multi-configurable buttons 1 is switched to a configuration with three buttons for operation. As a result, after determining to use the single button, the two buttons or the three buttons according to different operating requirements, the user is capable of sliding the rotating cylinder 132 through the opening 110 of the housing 11 by his (or her) finger, so as to expose the first click portion 134, the second click portion 135 or the third click portion 136 through the opening 110 for a single button operating usage, a two buttons operating usage or a three buttons operating usage.

Figure 6B:
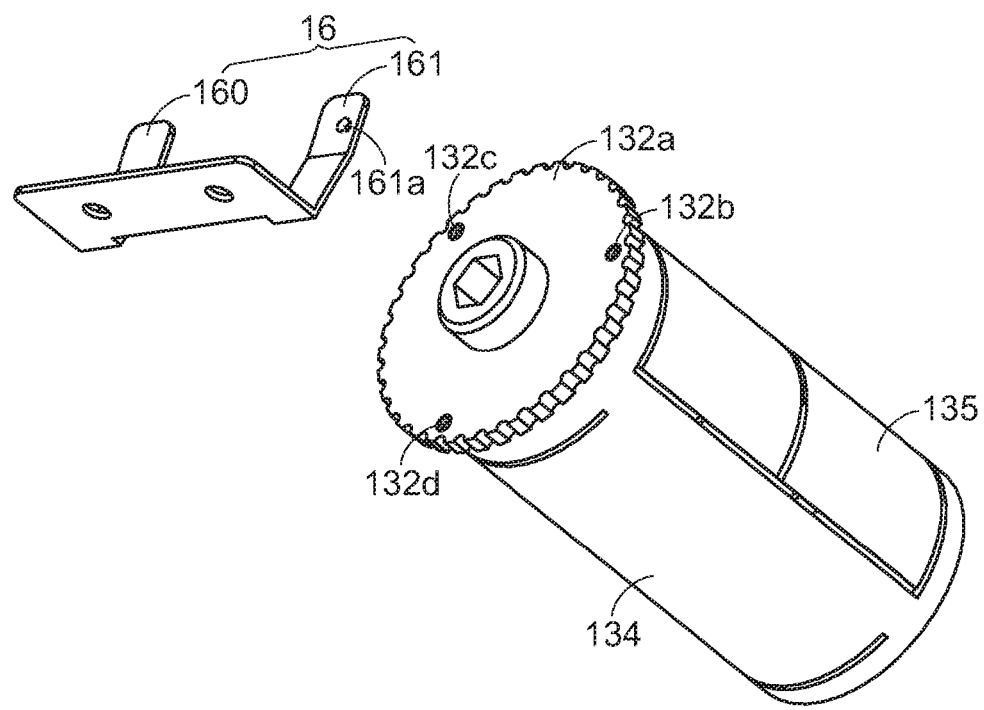
FIG. 6B illustrates a perspective view of a rotating cylinder of the mouse with multi-configurable buttons according to the second embodiment of the present invention.

Referring to FIG. 3B, FIG. 4B and FIG. 5B again, which illustrate the explosion views respectively about the first click portion 134, the second click portion 135 and the third click portion 136 being exposed through the opening 110 according to the second embodiment. The mouse with multi-configurable buttons 1 of the second embodiment further has some structures omitted herein due to similar to those of the first embodiment, such as the positioning structure 117, the fastening elastic strip 16, the gear structure 138 and the circuit board 150. It should be noted that the rotating cylinder 132 in the present embodiment has an outer bottom surface 132a parallel to the radial direction of the rotating cylinder 132. Moreover, the outer bottom surface 132a of the rotating cylinder 132 has a first denting portion 132b, a second denting portion 132c and a third denting portion 132d (as shown in FIG. 6B) due to the mouse with multi-configurable buttons 1 has the first click portion 134, the second click portion 135 and the third click portion 136, and the first denting portion 132b, the second denting portion 132c and the third denting portion 132d are capable of containing the protruding portion 161a. Thus, when the protruding portion 161a of the outer end 161 of the fastening elastic strip 16 is engaged with the first denting portion 132b, the first click portion 134 is exposed through the opening 110, so as to provide the single button operating usage for the user. In contrast, when the protruding portion 161a of the outer end 161 of the fastening elastic strip 16 is engaged with the second denting portion 132c, the second click portion 135 is exposed through the opening 110, so as to provide the two buttons operating usage for the user. Furthermore, when the protruding portion 161a of the outer end 161 of the fastening elastic strip 16 is engaged with the third denting portion 132d, the third click portion 136 is exposed through the opening 110, so as to provide the three buttons operating usage for the user. Besides, according to the foregoing configurations of the protruding portion 161a relative to the first denting portion 132b, the second denting portion 132c and the third denting portion 132d accompanied with the fastening elastic strip 16 capable of partially sustaining elastic deformation, the user is capable of easily executing the position limitation of the rotating cylinder 132.

In summary, the rotating cylinder of the mouse with multi-configurable buttons provided in the present invention includes at least two click portions. In other words, a number of the multi-configurable buttons is at least two, and the rotating cylinder is able to be rotated and received in the housing 11. Hence, the number of the buttons is capable of being adjusted by rotating the rotating cylinder of the mouse with multi-configurable buttons according to the different operating requirements of the user. Further, according to a well configuration of the fastening elastic strip accompanied with the fastening elastic strip, it is capable of limiting the click portion of the rotating cylinder at a predetermined position more easily, so as to expose a proper number of the buttons according to the user's requirement.

Although specific embodiments of the present invention have been described above, they do not intend to limit the scope of the claims of the present invention. As a result, all of the variations and the modifications equivalent to the specification and the drawings of the present invention should be included within the scope of the claims of the present invention.

What is claimed is:

1. A mouse with multi-configurable buttons, comprising:
   a housing, having an opening;
   a cylinder module, received in the housing and partially exposed through the opening, wherein the cylinder module comprises:
   a supporting shaft, fixed within the housing; and
   a rotating cylinder, wherein the rotating cylinder is fitting onto the supporting shaft and rotating with respect to the supporting shaft, a cylindrical surface of the rotating cylinder is exposed through the opening, and the cylindrical surface at least comprises a first click portion and a second click portion arranged along a rotating direction of the rotating cylinder in sequence; and
   a signal processing device, disposed between the supporting shaft and the rotating cylinder, wherein the signal processing device at least comprises a first switch and a second switch;
   wherein when the first click portion is exposed through the opening, the first click portion is used for activating the first switch, and when the second portion is exposed through the opening, the second click portion is used for activating the first switch and the second switch.

2. The mouse with multi-configurable buttons as claimed in claim 1, wherein a first button is formed on the first click portion and having a dent, and when the first button is pressed, the first button activates the first switch, while the second switch inserts into the dent and thus is not activated.

3. The mouse with multi-configurable buttons as claimed in claim 2, wherein two second buttons are formed on the second click portion along a direction parallel to the supporting shaft and used for respectively activating the first switch and the second switch.

4. The mouse with multi-configurable buttons as claimed in claim 3, wherein the housing comprises a positioning structure, and the positioning structure is fixed to an end of the supporting shaft.

5. The mouse with multi-configurable buttons as claimed in claim 4, further comprising a fastening elastic strip, wherein the fastening elastic strip has an inner end and an outer end, the inner end is fixed to the housing, and the outer end has a protruding portion.

6. The mouse with multi-configurable buttons as claimed in claim 5, wherein the rotating cylinder has an outer bottom surface parallel to a radial direction of the rotating cylinder, and the outer bottom surface has a first denting portion and a second denting portion, when the protruding portion is engaged with the first denting portion, the first click portion is exposed through the opening, and when the protruding portion is engaged with the second denting portion, the second click portion is exposed through the opening.

7. The mouse with multi-configurable buttons as claimed in claim 6, wherein the rotating cylinder further comprises a gear structure, and the gear structure surrounds the cylindrical surface of the rotating cylinder.

8. The mouse with multi-configurable buttons as claimed in claim 1, wherein the signal processing device further comprises a circuit board used for disposing the first switch and the second switch.

9. The mouse with multi-configurable buttons as claimed in claim 1, wherein the cylindrical surface further comprises a third click portion along the rotating direction.

10. The mouse with multi-configurable buttons as claimed in claim 9, wherein the signal processing device further comprises a third switch.

11. The mouse with multi-configurable buttons as claimed in claim 10, wherein a first button is formed on the first click portion and having a first dent and a second dent, and when the first button is pressed, the first button activates the first switch, while the second switch and the third switch respectively insert into the first dent and the second dent and thus are not activated.

12. The mouse with multi-configurable buttons as claimed in claim 11, wherein two second buttons are formed on the second click portion along a direction parallel to the supporting shaft, a third dent is formed on where the two second buttons are adjacent to each other, the two buttons are used for being pressed and thus respectively activate the second switch and the third switch, and when any one of the second buttons is pressed, the first switch inserts into the third dent and thus is not activated.

13. The mouse with multi-configurable buttons as claimed in claim 12, wherein three third buttons are formed on the third click portion along the direction parallel to the supporting shaft and used for respectively activating the first switch, the second switch and the third switch.

14. The mouse with multi-configurable buttons as claimed in claim 13, wherein the housing comprises a positioning structure, and the positioning structure is fixed to the supporting shaft.

15. The mouse with multi-configurable buttons as claimed in claim 14, further comprising a fastening elastic strip, wherein the fastening elastic strip has an inner end and an outer end, the inner end is fixed to the housing, and the outer end has a protruding portion.

16. The mouse with multi-configurable buttons as claimed in claim 15, wherein the rotating cylinder has an outer bottom surface parallel to a radial direction of the rotating cylinder, and the outer bottom surface has a first denting portion, a second denting portion and a third denting portion, when the protruding portion is engaged with the first denting portion, the first click portion is exposed through the opening, when the protruding portion is engaged with the second denting portion, the second click portion is exposed through the opening, and when the protruding portion is engaged with the third denting portion, the third click portion is exposed through the opening.

17. The mouse with multi-configurable buttons as claimed in claim 16, wherein the rotating cylinder further comprises a gear structure, and the gear structure surrounds the cylindrical surface of the rotating cylinder.

18. The mouse with multi-configurable buttons as claimed in claim 11, wherein the signal processing device further comprises a circuit board used for disposing the first switch, the second switch and the third switch.

* * * * *